Figure 1:
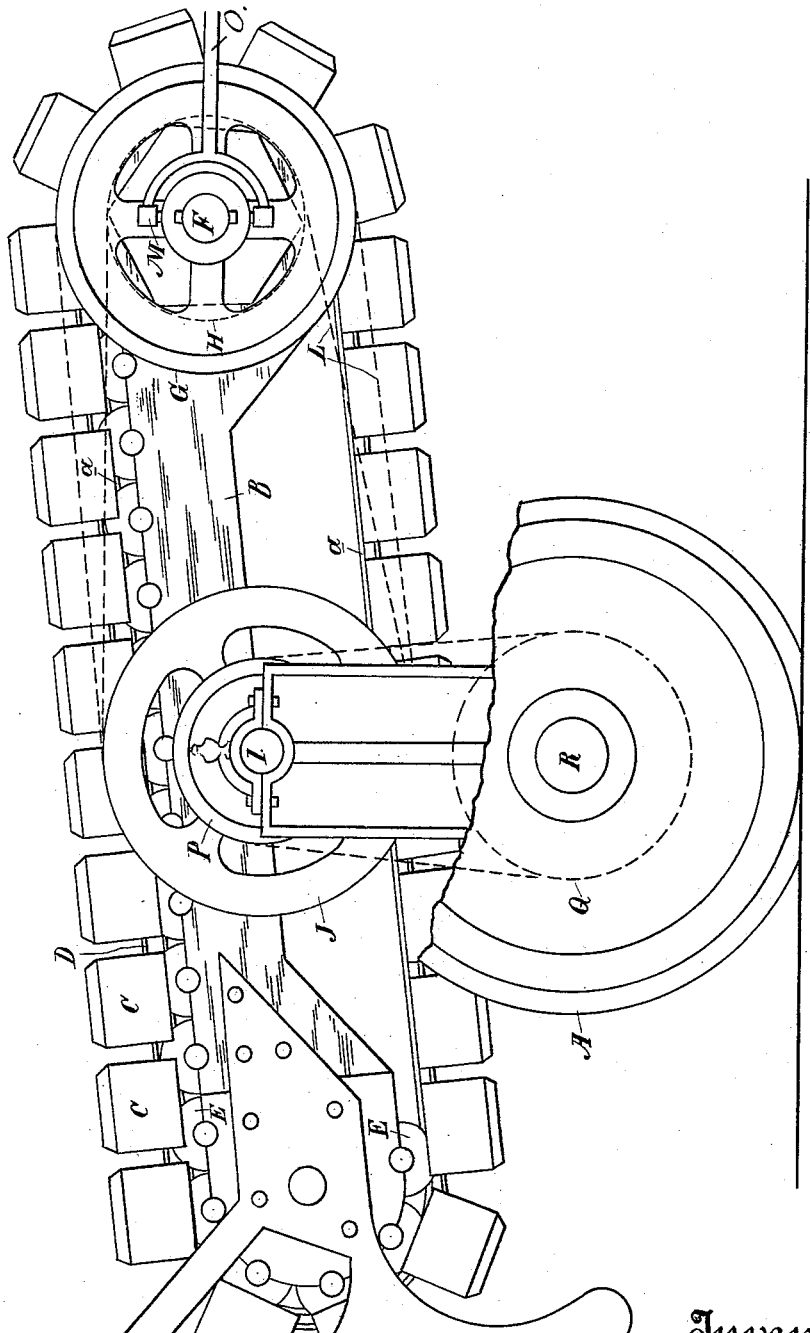

(No Model.) 2 Sheets—Sheet 1.

F. O. LANDGRANE, M. P. SCHETZEL & M. E. WILLIS.
MEANS FOR THE PROPULSION OF VEHICLES OR CARS.

No. 333,234. Patented Dec. 29, 1885.

Witnesses
Geo. H. Strong.
J. H. Rouse.

Inventor,
F. O. Landgrane
M. P. Schetzel
M. E. Willis
By Dewey & Co.
Attorneys

N. PETERS, Photo-Lithographer, Washington, D. C.

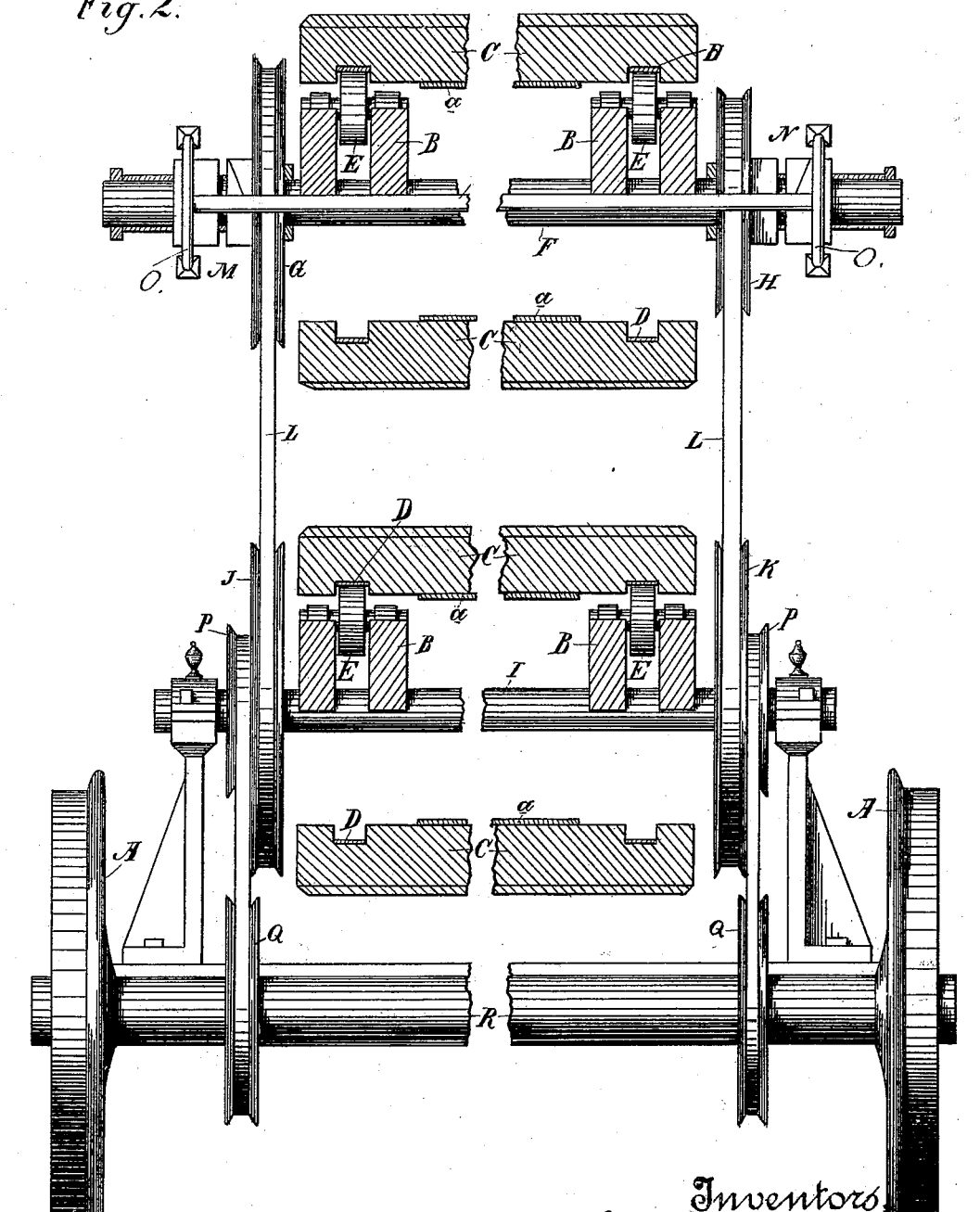

UNITED STATES PATENT OFFICE.

FRANK O. LANDGRANE, MARX P. SCHETZEL, AND MILTON E. WILLIS, OF SAN FRANCISCO, CALIFORNIA.

MEANS FOR THE PROPULSION OF VEHICLES OR CARS.

SPECIFICATION forming part of Letters Patent No. 333,234, dated December 29, 1885.

Application filed September 14, 1885. Serial No. 177,124. (No model.)

*To all whom it may concern:*

Be it known that we, FRANK O. LANDGRANE, MARX P. SCHETZEL, and MILTON E. WILLIS, all of the city and county of San Francisco, State of California, have invented an Improvement in Means for the Propulsion of Vehicles or Cars; and we hereby declare the following to be a full, clear, and exact description of the same.

Our invention relates to a means for the propulsion of cars or other vehicles.

It consists of an endless traveling platform-belt, which is so constructed that a horse or other animal may travel upon said platform, and this is carried by the car or vehicle to be propelled, having a means for communicating power from it to the traction-wheels, and means for increasing or decreasing the power, according to the grade or amount of load, and also a means for increasing or decreasing the angle at which the platform is supported, together with certain details of construction, all of which will be more fully described by reference to the accompanying drawings, in which—

Figure 1 is a side elevation of our apparatus. Fig. 2 is a transverse vertical section for the purpose of explaining our invention.

We have in the present case shown a single pair of bearing-wheels of a car or vehicle at A.

B is a portion of the frame-work or timbers which are intended to support the upper portion of the traveling platform or belt, which is composed of wooden blocks or strips C, of suitable width and thickness, said blocks being united together by links or flexible straps D, of any suitable construction, so as to allow the passage of the united blocks around the pulleys or supports at the ends.

Upon the upper side of the timbers B are journaled rollers E, which are placed closely together, extending the whole length, and the transverse strips or blocks C have grooves or channels made across them on the under side, to fit over these rollers, so that the blocks will be carried by these rollers as they move from one end to the other. Flexible metallic or other bands, a, pass around the rollers or pulleys at each end of the apparatus, being carried upon the rollers E, so as to form continuous supports, upon which the blocks or strips C pass from one roller to the next. The surface of these blocks or strips serve as a platform upon which the horse or other animal may travel, being suitably attached to some fixed part of the car or vehicle, so that the animal's forward movement will cause the platform to move over the rollers. The rear end may pass around rollers similar to those shown at E, or it may pass around a single drum of any suitable shape or form, and from that point to the front end it passes beneath the timbers or frame-work B. At the front end is a drum, which may be made polygonal or arranged in any well-known or suitable manner, so that the passage of this traveling platform or belt around it will cause it to rotate. This drum is secured to a shaft, F, and this shaft has keyed to it outside of the traveling platform two pulleys, G and H, the first being of more circumference than the second. The central portion of the frame-work B is journaled upon or supported by a shaft, I, about which the whole platform may be tilted, so as to set it at any desired angle, as will be more fully described hereinafter.

Upon the shaft I are fixed two pulleys, J and K, and the belts, wires, ropes, or chains; or any suitable means for communicating power from the pulleys G and H to pulleys J and K may be employed. In the present case we have represented these means by simple belts L L. The pulleys G and H are not fixed rigidly to the shaft F, but turn loosely upon it, and either one or the other may be connected, so as to be driven by it, by means of the clutch mechanism, as shown at M and N, any suitable or well-known form of clutch being employed for this purpose.

O is a clutch-lever, (shown plainly in Fig. 1,) there being one of these levers in connection with each clutch mechanism, so that one may be thrown into connection with its pulley and the other thrown out at the same time. When the road is comparatively level and the load light, the larger pulley G will be caused to move with its greatest rapidity; but when there is a hill or the load is heavy this pulley may be thrown out of gear, and the pulley H may be thrown into gear, so that it will drive the shaft I, and through it the pulleys P, which are secured to it, and from which belts or chains extend to pulleys Q upon the shaft or axle R of the wheels A. By this means the power of the animal is communicated through the traveling belt of the platform and intermediate gearing to the traction-wheels of the car.

It will be manifest that the position of the platform can be varied to suit the grades over which the car passes. When the road is entirely or quite level, the angle at which the platform stands may be small; but when the grade is steep it will be necessary to change the angle of the platform so that the weight of the horse will act upon a more considerable inclination, thus giving greater power. This change of angle is effected by means of a rack, S, which we have shown bolted to the rear end of the frame-work B, and it may be moved up or down by a worm or screw, T, or a pinion, or by other suitable means, so that the platform may be tilted about its center of support—the shaft I. It will be seen by this construction that the platform may have its inclination considerably changed without in any way affecting the tension of the driving-belts or the relative position of the gearing by which the power is transmitted, as it all works about the common center.

It will be manifest that various modifications of this mechanism may be made without materially altering its character or the principle involved, which is the application of the weight and the power of the animal to a traveling platform for the purpose of propelling cars or vehicles upon which said platform is mounted.

Having thus described our invention, what we claim as new, and desire to secure by Letters Patent, is—

1. The means for propelling cars, consisting of the endless traveling belt or platform upon which the horse or other animal may walk, a drum or pulley over which the belt or platform passes, and to which its motion is transmitted, and intermediate gearing or belts, whereby the power may be transmitted to the traction-wheels of the car, substantially as herein described.

2. In combination with the traveling belt or platform through which animal-power may be applied, pulleys G and H upon the shaft of the drum to which the power is transmitted, and the clutches and levers, whereby either of the pulleys may be caused to rotate and the other be thrown out of action, substantially as herein described.

3. In combination with the traveling belt or platform through which animal-power may be applied, the drum over which said traveling belt or platform passes, pulleys of different sizes upon the shaft of said drum, and clutches by which one or the other of said pulleys may be thrown into gear, and belts or chains extending from said pulleys to the intermediate ones, from which the power is transmitted to the axle of the traction-wheels, substantially as herein described.

4. The endless traveling belt or platform composed of transverse slats, strips, or blocks with flexible connecting-links, said strips, slats, or blocks being slotted or grooved upon their lower faces, in combination with the series of rollers journaled upon the frame-work and having their rims fitted to travel in the channels or slots, so as to support the traveling belt or platform, substantially as herein described.

5. An endless traveling belt or platform passing over rollers, drums, or pulleys, by which the power applied to the traveling belt or platform may be transmitted to the frame-work by which the mechanism is supported, and a shaft or axis by which the central portion of the frame is journaled, in combination with a rack attached to one end of the frame-work, whereby the angle of the traveling belt may be changed, substantially as herein described.

6. The endless traveling belt or platform composed of transverse strips or blocks with flexible connecting-links, said strips or blocks having transverse grooves or channels in their lower faces, in combination with a series of rollers journaled upon the frame-work, so that their peripheries fit in the grooves in the blocks, and flexible belts passing over the rollers, so as to support the strips or blocks from one to the other, substantially as herein described.

In witness whereof we have hereunto set our hands.

FRANK O. LANDGRANE.
MARX P. SCHETZEL.
MILTON E. WILLIS.

Witnesses:
C. D. COLE,
S. H. NOURSE.